US008297397B2

(12) United States Patent
Tsutsui et al.

(10) Patent No.: US 8,297,397 B2
(45) Date of Patent: Oct. 30, 2012

(54) SERVO MOTOR LAYOUT STRUCTURE OF SADDLE-RIDE TYPE VEHICLE

(75) Inventors: Noriyoshi Tsutsui, Saitama (JP); Tomoki Nishijima, Saitama (JP); Takuma Koishikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 181 days.

(21) Appl. No.: 12/954,083

(22) Filed: Nov. 24, 2010

(65) Prior Publication Data

US 2011/0127098 A1 Jun. 2, 2011

(30) Foreign Application Priority Data

Nov. 27, 2009 (JP) ................................ 2009-269943

(51) Int. Cl.
*B62D 61/02* (2006.01)

(52) U.S. Cl. ....................................... 180/219; 180/296

(58) Field of Classification Search .................. 180/219, 180/296, 309; 60/324
See application file for complete search history.

(56) References Cited

U.S. PATENT DOCUMENTS

| | | | | |
|---|---|---|---|---|
| 2005/0067211 | A1* | 3/2005 | Inaoka et al. | 180/309 |
| 2007/0062752 | A1* | 3/2007 | Sugita et al. | 180/309 |
| 2009/0008900 | A1 | 1/2009 | Ishikawa et al. | |

FOREIGN PATENT DOCUMENTS

| | | |
|---|---|---|
| JP | 2005-67552 A | 3/2005 |
| JP | 2009-12645 A | 1/2009 |

* cited by examiner

*Primary Examiner* — Tashiana Adams
(74) *Attorney, Agent, or Firm* — Birch, Stewart, Kolasch & Birch, LLP

(57) ABSTRACT

A servo motor is positioned in a place except the downside of a seat to inhibit the length and the curvature of a cable in servo motor layout structure of a saddle-ride type vehicle provided with the servo motor for driving an exhaust valve. A swing arm a front end of which is swingably supported by at least either a body frame or an engine and a rear end of which journals a rear wheel is provided and an exhaust valve and a servo motor are arranged on the downside of the swing arm in a side view.

20 Claims, 15 Drawing Sheets

SERVO MOTOR LAYOUT STRUCTURE OF SADDLE-RIDE TYPE VEHICLE

CROSS-REFERENCE TO RELATED APPLICATIONS

The present application claims priority under 35 USC 119 to Japanese Patent Application No. 2009-269943 filed on Nov. 27, 2009 the entire contents of which are hereby incorporated by reference.

BACKGROUND OF THE INVENTION

1. Field of the Invention

This invention relates to the servo motor layout structure of a saddle-ride type vehicle.

2. Description of Background Art

A servo motor for driving an exhaust valve is disclosed in JP-A No. 2005-067552 that is provided to an exhaust pipe of a scooter-type motorcycle that is arranged inside a rear cover under a seat. In JP-A No. 2009-012645, a servo motor for driving an exhaust valve is arranged under a seat of a motorcycle. The servo motor for the motorcycle is relatively large in size and is heavy. Thus, the servo motor is generally arranged in the space under the seat.

However, when another part such as a seat adjustment mechanism and an ABS modulator is arranged under the seat, space for arranging the servo motor sometimes cannot be secured. In this case, the servo motor is required to be arranged in another place. However, when the servo motor is arranged apart from the exhaust valve, a cable is often curved in laying out the cable depending upon the arrangement of a peripheral part and as it is thought that the torque of the servo motor is not enough. Thus, the layout requires a device.

SUMMARY AND OBJECTS OF THE INVENTION

According to an embodiment of the present invention, the servo motor layout structure of a saddle-ride type vehicle is provided with a servo motor for driving an exhaust valve wherein the servo motor is efficiently arranged in a place except the downside of a seat, inhibiting the length and the curvature of a cable.

For a settlement of the problem, according to an embodiment of the present invention, the servo motor layout structure of a saddle-ride type vehicle, for example, a motorcycle 1, is provided with an engine 17 supported by a body frame 5, a swing arm 14 a front end of which is swingably supported by at least either of the body frame or the engine and a rear end of which journals a rear wheel 15. An exhaust pipe 22 is provided that is connected to the engine with an exhaust valve 51 provided in the exhaust pipe. A servo motor 56 is provided that drives the exhaust valve. A cable 59 couples the exhaust valve and the servo motor. The exhaust valve and the servo motor are arranged on the downside of the swing arm in a side view.

The above-mentioned saddle-ride type vehicle includes the whole vehicles on each of which a rider rides with the rider straddling each vehicle body and also includes not only a motorcycle (including a motorbike and a scooter-type vehicle) but a three-wheeled vehicle (also including a vehicle provided with one wheel in the front and two wheels in the rear and a vehicle provided with two wheels in the front and one wheel in the rear) and a four-wheel vehicle.

According to an embodiment of the present invention, a servo motor stay 60 that assists the servo motor to be supported by the body frame is provided and the servo motor stay is provided with a beam part 62 wherein the front is fastened to a lower part of the body frame. A servo motor attachment 63 is provided to the rear of the beam part with a detent 64 extending forward from the servo motor attachment and coupled to the lower part of the body frame at the back of a part fastened to a vehicle body (for example, a part 61 fastened to a vehicle body in the embodiment) of the beam part.

According to an embodiment of the present invention, a main stand support 46 journals a main stand 45 provided to the lower part of the body frame and the detent of the servo motor stay is fastened to a stand swinging shaft (for example, a pivot bolt 47 in the embodiment) in the main stand support via a pipe bush **67*f***.

According to an embodiment of the present invention, the main stand is provided with a pair of left and right legs **45*a*, 45*b***, with the beam part of the servo motor stay longitudinally extending passing between the left and right legs with the front being curved on one side in a direction of vehicle width in front of the main stand support and being fastened to a bottom of the body frame.

According to an embodiment of the present invention, the servo motor stay is provided with a plate member (for example, the servo motor attachment 63 in the embodiment) formed by bending a steel plate, the plate member is provided with a substantially horizontal lower horizontal plate **65*a*, a vertical plate (for example, a rear vertical plate 65*c*, a vertical plate 66*c* in the embodiment) substantially vertically bent from one side edge of the lower horizontal plate, a pipe bush mounting part (for example, a round pipe joint 67*d*, a short pipe 67*e* in the embodiment) provided in front of the vertical plate and an upper horizontal plate (for example, a rear horizontal plate 65*d* and an upper horizontal plate 66*f*** in the embodiment) substantially horizontally bent from an upper edge of the vertical plate, the vertical plate extends forward to form the detent and the servo motor is mounted on the upper horizontal plate via rubber.

According to an embodiment of the present invention, a coupler locking hole (for example, a clip hole **56*h* in the embodiment) is provided for locking a coupler check member (for example, a clip 56*g* in the embodiment) provided to a coupler 56*f*** of the servo motor provided to the lower horizontal plate.

According to an embodiment of the present invention, a canister mounting part (for example, a canister supporting plate **68*a*** in the embodiment) is further provided to the servo motor stay.

According to an embodiment of the present invention, a rubber servo motor cover 69 is mounted on the servo motor.

According to an embodiment of the present invention, a weight 70 is provided to the body frame with the weight covering a side of the servo motor.

According to an embodiment of the present invention, the servo motor is provided with the servo motor biased on one side based upon a center line CL of the vehicle body in a bottom view of the vehicle body and the exhaust valve is provided with the exhaust valve biased on the other side based upon the center line of the vehicle body in the bottom view of the vehicle body.

According to an embodiment of the present invention, the length and the curvature of the cable that couples the exhaust valve and the servo motor can be inhibited, arranging the exhaust valve and the servo motor in a dead space under the swing arm.

According to an embodiment of the present invention, when the servo motor is arranged under the swing arm, the servo motor is required to be supported by a cantilever if no supporting part is especially provided to the body frame. However, the servo motor can be stably and securely supported by the body frame by using the servo motor stay provided with the beam part and the detent positions attached to the body frame which are longitudinally different.

According to an embodiment of the present invention, even if no mounting part is separately provided to the body frame, the detent can be coupled to the main stand support. Even if the servo motor stay is vertically vibrated due to irregularities of a road surface and others, vibration transmitted to the main stand support can be reduced because the detent is elastically supported via the pipe bush and a state in which the detent is supported can be more securely maintained.

According to an embodiment of the present invention, even if the main stand is being used or is stored, the servo motor stay can be attached to the body frame with the beam part avoiding the right and left legs.

According to an embodiment of the present invention, the servo motor stay can be provided at a low cost with a simple configuration by bending the plate member and forming the detent and the part for mounting the servo motor via rubber. As the detent is made of a plate, it is not bulky and the servo motor stay can be compacted.

According to an embodiment of the present invention, as the lower horizontal plate is made of a plate, the coupler locking hole can be easily provided.

According to an embodiment of the present invention, the canister can also be supported by the servo motor stay in the dead space under the swing arm.

According to an embodiment of the present invention, an effect of disturbance such as a splash from a road surface on the servo motor arranged under the swing arm can be inhibited.

According to an embodiment of the present invention, the weight excellent in strength and rigidity can also function as a cover that covers the side of the servo motor.

According to an embodiment of the present invention, the servo motor is separated from the exhaust pipe and the heat of the exhaust pipe can be prevented from having an effect on the servo motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
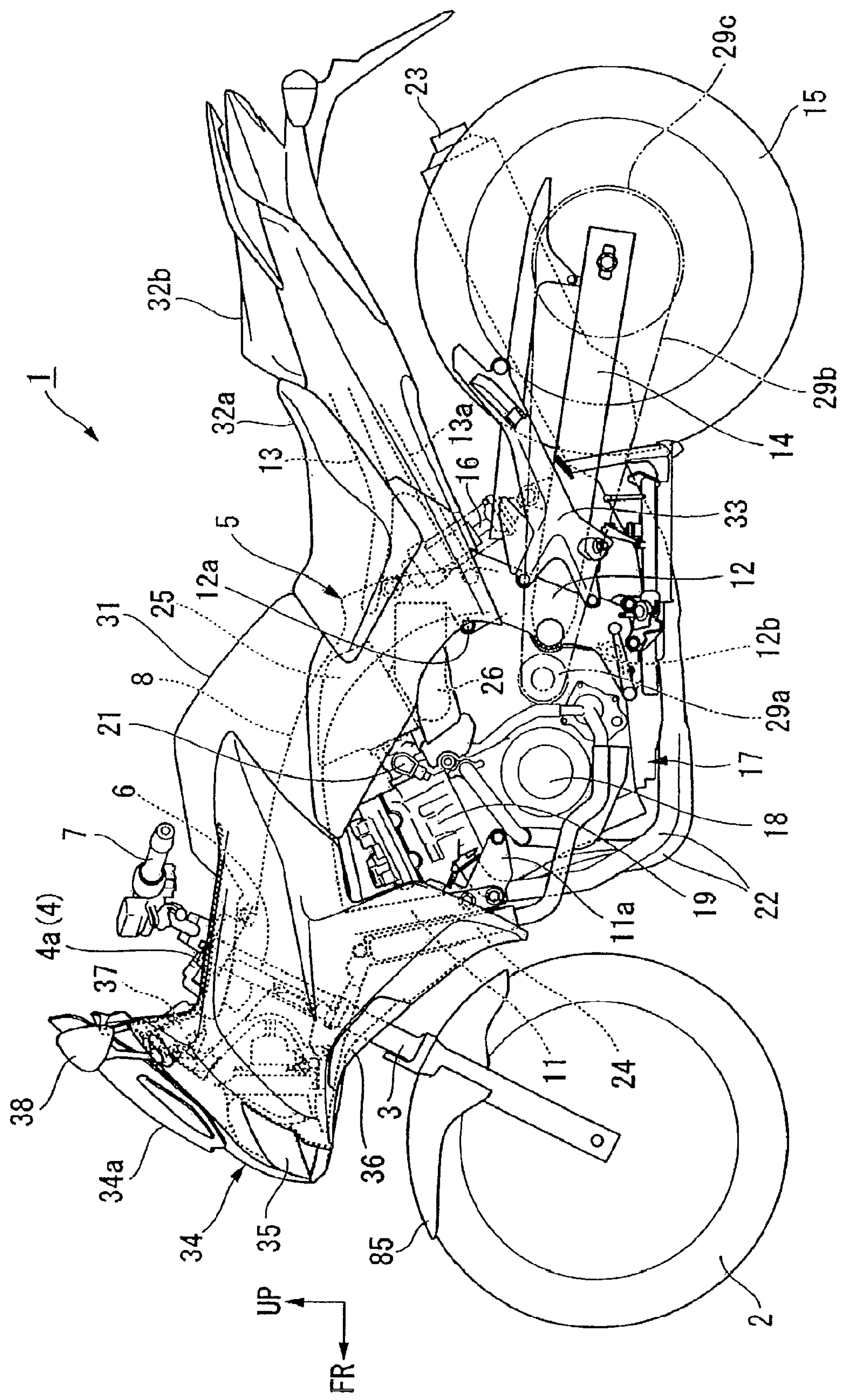
FIG. 1 is a left side view showing a motorcycle in an embodiment of the present invention.

Referring to the drawings, an embodiment of the invention will be described below. A direction such as a longitudinal direction and a lateral direction in the following description shall be the same as a vehicular direction unless special description is made. An arrow FR in the drawing points to the front side of a vehicle, LH points to the left of the vehicle, and UP points to the upside of the vehicle.

As shown in FIG. 1, a front wheel 2 of a motorcycle (a saddle-ride type vehicle) 1 is journaled to each lower end of a pair of right and left front forks 3 and an upper part of each front fork 3 is steerably journaled to a head pipe 6 at a front end of a body frame 5 via a steering stem 4. A handlebar 7 is attached onto a top bridge **4*a* of the steering stem 4**.

Figure 4:
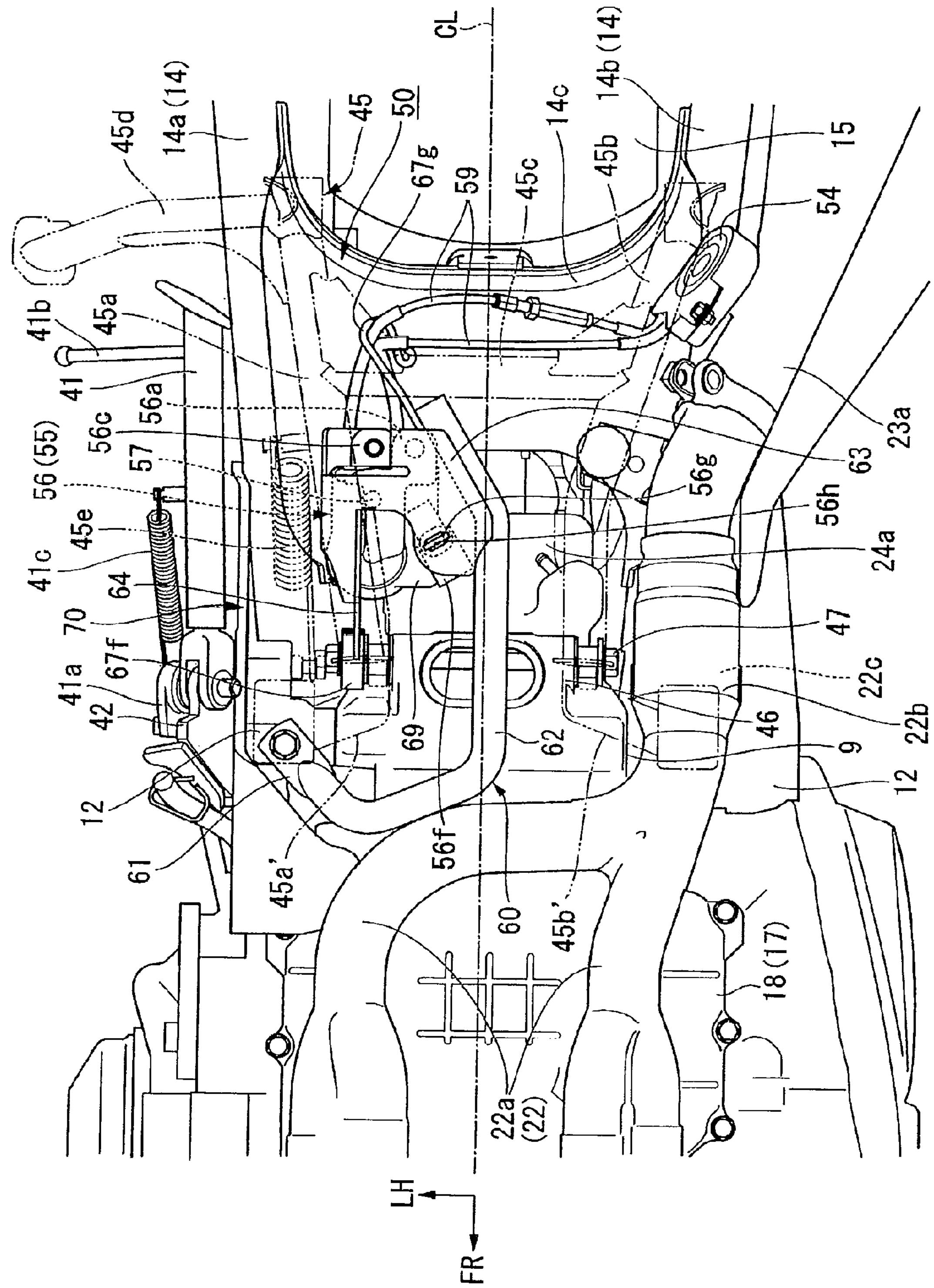
FIG. 4 is a bottom view showing the circumference of the exhaust device.

As also shown in FIG. 4, a rear wheel 15 of the motorcycle 1 is journaled to a rear end of a swing arm 14 and a front end of the swing arm 14 is vertically swingably journaled to a pivot frame 9 in a rear part of the body frame 5 and others. A rear shock absorber 16 is arranged between a front part of the swing arm 14 and the rear part of the body frame 5.

The body frame 5 is formed by integrally bonding a plurality of types of steel products (or castings) by welding and others and is a so-called monobackbone type acquired by extending one main frame 8 backward from the head pipe 6 to the pivot frame 9.

The main frame 8 extends backward, passing the upside of an engine (an internal combustion engine) 17 mounted inside the body frame 5, is curved downward, and is led and connected to an upper end of the vertically extending pivot frame 9 in an intermediate part in a longitudinal direction of a vehicle body. The main frame 8 and the pivot frame 9 are arranged in the center in a direction of vehicle width (a lateral direction) like the head pipe 6. A line CL in the drawing shows a lateral center line of the vehicle body.

A pair of right and left pivot brackets 12 is attached on both right and left sides of the pivot frame 9 with the pivot frame laterally held between the pivot brackets. Each front end of a seat rail 13 and a support pipe **13*a* for the seat rail is attached on the rear upside of the main frame 8**.

The body frame 5 is acquired by separately configuring a front piece forming the circumference of the head pipe 6, a center piece forming the main frame 8 and a rear piece forming the circumference of the pivot frame 9 by aluminum casting for example and integrally welding the pieces. The right and left pivot brackets 12 configuring a part of the body frame 5 are also formed by aluminum casting like each piece and are integrally fastened and fixed to the pivot frame 9 by a bolt and by other means.

Figure 2:
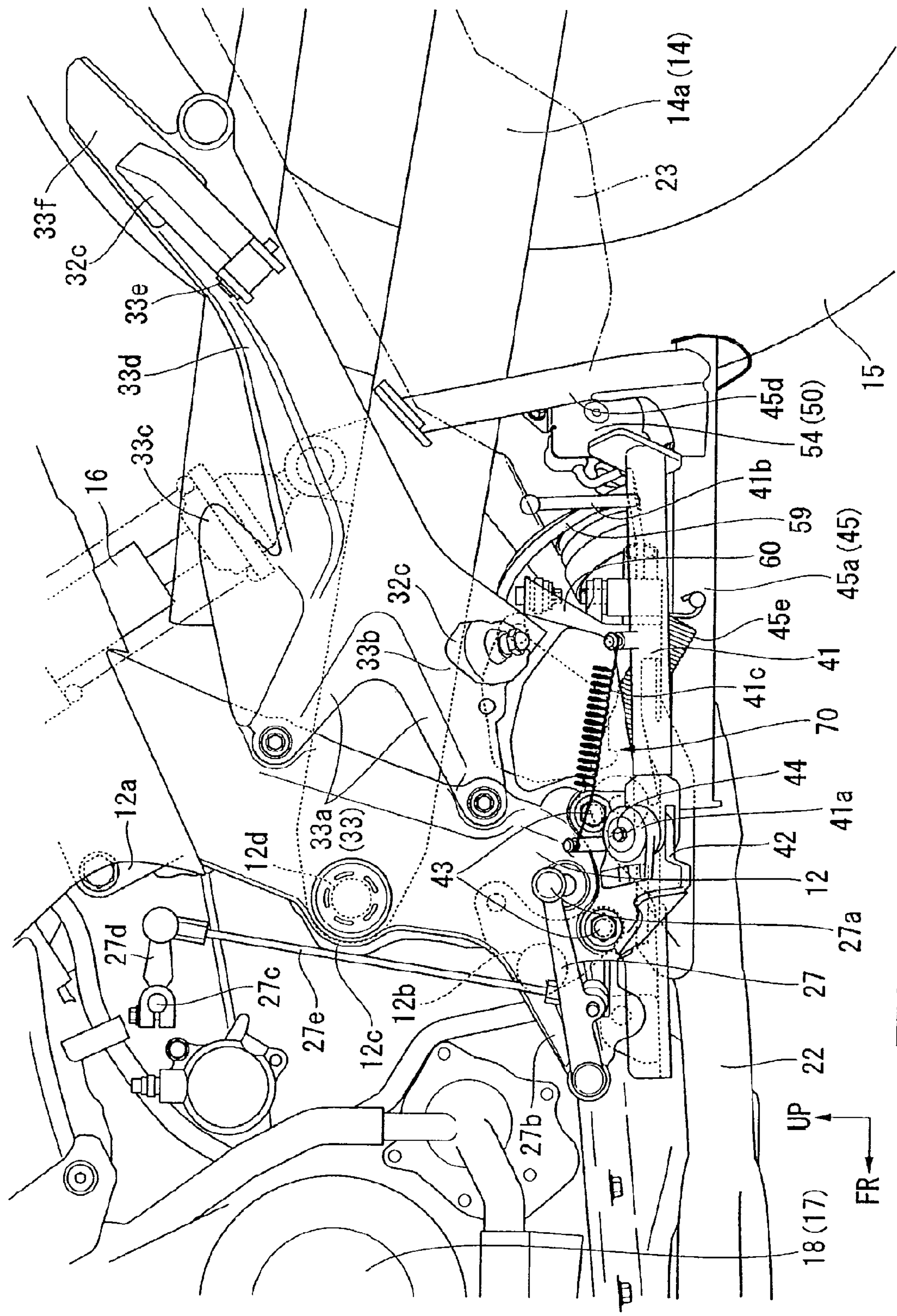
FIG. 2 is a left side view showing a circumference of a pivot bracket of the motorcycle.
Figure 3:
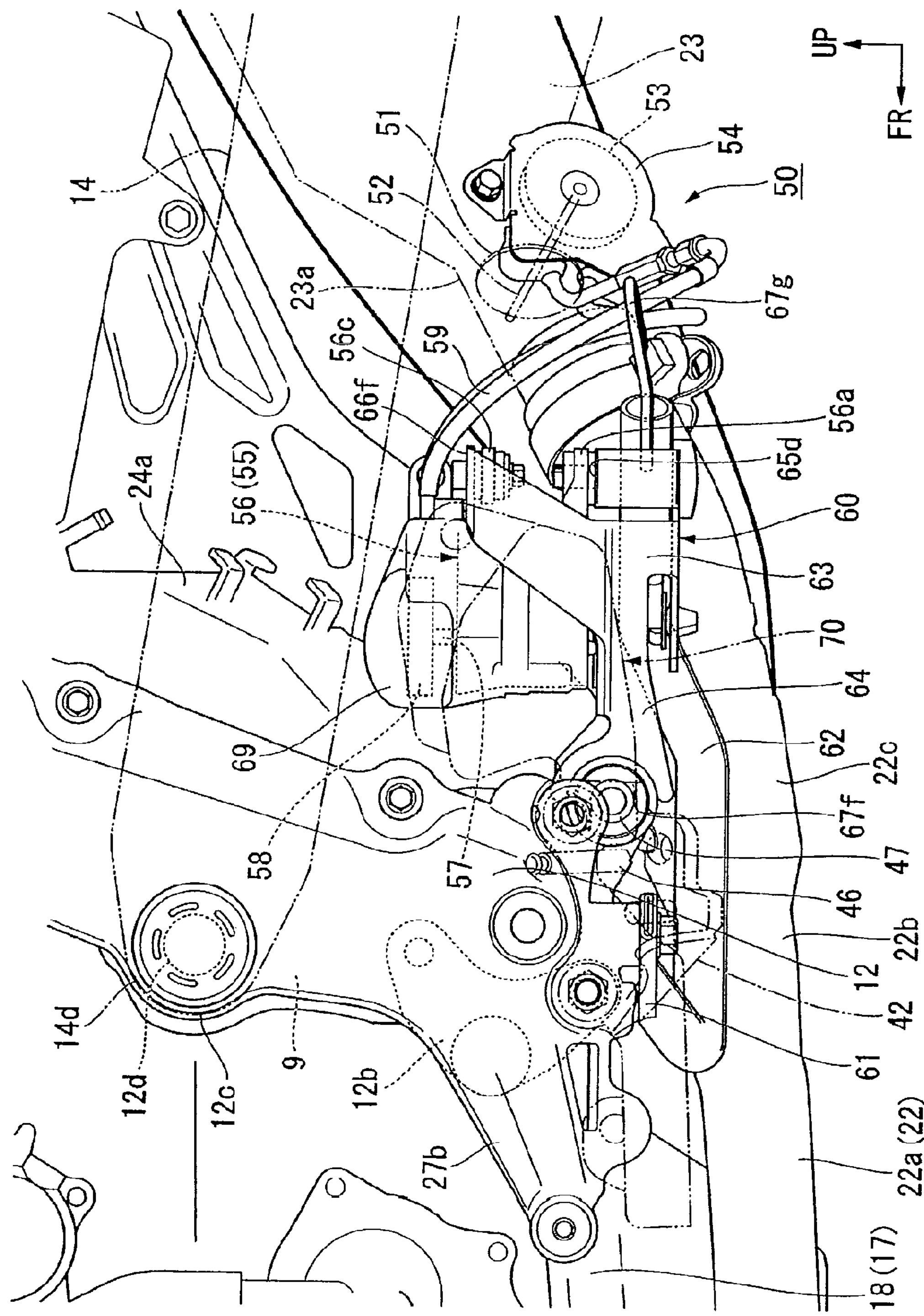
FIG. 3 is a left side view showing a circumference of an exhaust device in the vicinity of the pivot bracket.

As shown in FIGS. 2 to 4, a pivot part (not shown) which a pivot 12*d* of the swing arm 14 pierces is provided on the front side of a vertically intermediate part of the pivot frame 9, and left and right arm pivot parts 14*d* separately provided to each front end of left and right arms 14*a*, 14*b* of the swing arm 14 are respectively adjacently arranged outside the pivot part in the direction of vehicle width.

Outer pivot parts 12*c* provided to the right and left pivot brackets 12 are respectively adjacently arranged outside the right and left arm pivot parts 14*d* in the direction of vehicle width. The front end of the swing arm 14 is vertically swingably journaled to the body frame 5 by piercing each pivot part with the pivot 12*d* laterally directed and coupling each pivot part. A cross member 14*c* couples the fronts of the left and right arms 14*a*, 14*b* of the swing arm 14.

As shown in FIG. 1, the engine 17 is a parallel 4-cylinder engine having a rotational axis of a crank in the direction of vehicle width and has a basic configuration in which a cylinder 19 is planted on a crankcase 18 diagonally forward and upward. Each of four throttle bodies 21 is connected to the rear of each cylinder 19 and each of four exhaust pipes 22 is similarly connected to the front of each cylinder 19.

Each throttle body 21 is connected to an air cleaner case 25 arranged at the back of each throttle body. An intake duct 26 is arranged along the left side of the air cleaner case 25 and is open to the rear of the vehicle.

As also shown in FIG. 4, each exhaust pipe 22 is suitably curved in front of the engine 17, reaches the downside of the crankcase 18, after the right and left two pipes are integrated on both sides of the downside of the crankcase 18 to be a preparatory collecting pipe 22*a*, the preparatory collecting pipes are integrated to be one pipe at the back of the right side of the downside of the crankcase 18 to be a collecting pipe 22*b*. The collecting pipe 22*b* is connected to a connecting pipe 23*a* at a front end of a silencer 23 arranged on the right side of the rear wheel 15. The connecting pipe 23*a* at the front end forms a part of the exhaust pipe 22.

The front of the collecting pipe 22*b* passes the downside of the right pivot bracket 12 and an exhaust catalyst 22*c* is built in the front of the collecting pipe 22*b*.

As shown in FIG. 1, a pair of right and left engine hangers 11 is tilted just from the back of the head pipe 6 mutually separately and extends downward. A radiator 24 tilted forward along the engine hangers is arranged just in front of the right and left engine hangers 11. A reserve tank 24*a* of the radiator 24 is arranged at the back of the pivot frame 9 (see FIGS. 3 and 4).

As the engine 17 is supported by a supporting plate 11*a* via which the front of the cylinder 19 is fixed to a lower part of the engine hanger 11 and an upper part and a lower part of the rear of the crankcase 18 are supported by an upper part supporting bracket 12*a* and a lower part supporting bracket 12*b* respectively fixed to an upper part and a lower part of the pivot frame 9, the engine 17 is supported by the body frame 5.

The rotational driving force of the engine 17 is output to a drive sprocket 29*a* on the left side of the rear of the crankcase 18 via a clutch mechanism and a transmission respectively not shown and is transmitted to the rear wheel 15 via a drive chain 29*b* and a driven sprocket 29*c*.

A fuel tank 31 is arranged over the engine 17 across the main frame 8. A seat 32*a* for a rider and a tandem seat 32*b* for a rear pillion passenger are arranged longitudinally at the back of the fuel tank 31. A step 32*c* for the rider is arranged below the seat 32*a* and a tandem step 32*d* for the rear pillion passenger is arranged below the tandem seat 32*b*.

As also shown in FIG. 2, a front end of a step bracket 33 that longitudinally supports each step 32*c*, 32*d* is attached to the rear of the pivot bracket 12. The step bracket 33 is integrated by casting using aluminum alloy materials for example and is provided at the back of the pivot bracket 12 in a state in which the step bracket is tilted backward and upward.

The front 33*a* of the step bracket 33 is in a substantial V shape open forward in a side view, and upper and lower front ends of the front are fastened and fixed to upper and lower parts of a rear edge of the pivot bracket 12 by a bolt inserted from the outside in the direction of vehicle width. A front step supporting part 33*b* that tiltably supports the step 32*c* for the rider is integrated with the downside of the front 33*a* of the step bracket 33 and a front heel plate 33*c* for touching to the circumference of the heel of a foot put on the step 32*c* from the inside in the direction of vehicle width is integrated with the upside of the front 33*a* of the step bracket 33.

The rear 33*d* of the step bracket 33 extends backward and upward from a rear end of the front 33*a* with the rear tilted, a rear step supporting part 33*e* that tiltably supports the tandem step 32*d* for the rear pillion passenger is integrated with a rear end of the rear, and a rear heel plate 33*f* for touching to the circumference of the heel of a foot put on the tandem step 32*d* from the inside in the direction of vehicle width is integrated with the rear end.

A shift pedal 27 for shifting the transmission in the rear of the crankcase 18 is arranged in front of the left step 32*c*. The shift pedal 27 is provided with a body 27*a* of the pedal which can be operated by a rider's left foot put on the left step 32*c* outside its rear end (its end) and is turnably supported by a pedal supporting part 27*b* a front end (a base) of which extends on the front side of a lower part 12*b* of the pivot bracket 12.

A shift spindle 27*c* protrudes from the left side of the rear of the crankcase 18 and a front end (a base) of a shift lever 27*d* is fitted and fixed to the shift spindle 27*c*. An upper end of a shift rod 27*e* is turnably coupled to a rear end (an end) of the shift lever 27*d* and a lower end of the shift rod 27*e* is turnably coupled to an intermediate part in the longitudinal direction of the shift pedal 27. Hereby, the shift pedal 27 and the shift spindle 27*c* are linked and the shift is enabled.

Figure 5:
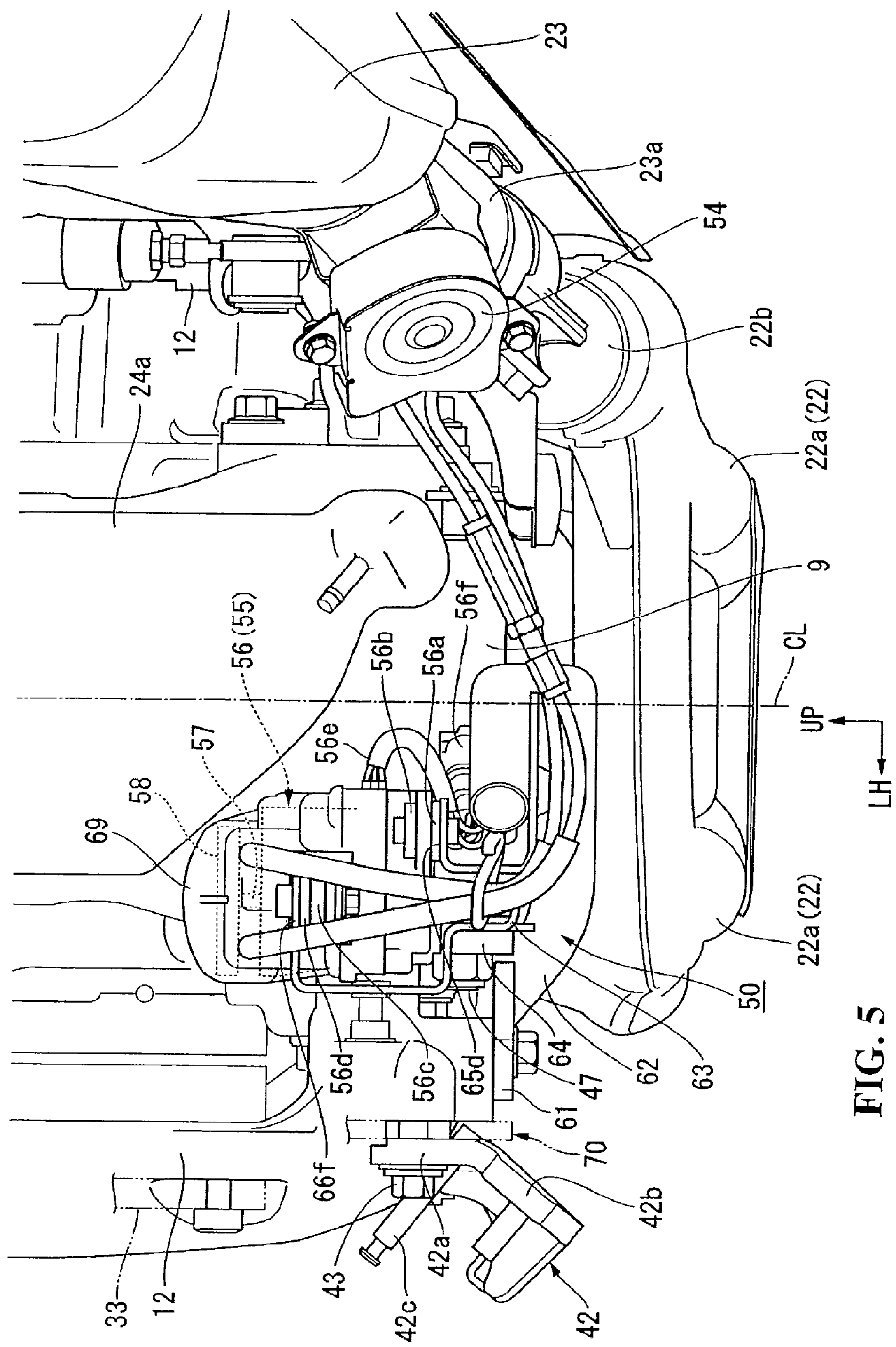
FIG. 5 is a rear view showing the circumference of the exhaust device.

As shown in FIGS. 2 and 5, a side stand 41 that supports the vehicle body which stands with the vehicle body tilted on the left side is provided on the left side of a lower part of the vehicle body.

The side stand 41 is turnably (storably) supported by a lower part 42*b* of a flat side stand bracket 42 fastened and fixed to a lower end of the left pivot bracket 12 by a longitudinal pair of bolts 43 via a pivot bolt 44 tilted so that the outside in the direction of vehicle width of it is located uppermost. FIG. 2 shows a stored state in which the side of an end of the side stand 41 is sprung up backward.

Outside a base of the side stand 41, a rotary switch 41*a* that detects the side stand is stored or stands is provided coaxially with the pivot bolt 44. An operating rod 41*b* extends from the outside of the end of the side stand 41 and a return spring 41*c* is arranged outside the base of the side stand 41.

The side stand bracket 42 is made of a thick steel plate, its upper part 42*a* functions as a part fixed to the vehicle body which is formed into a plate shape perpendicular to the lateral direction and is fastened to the lower end of the left pivot bracket 12 from the outside in the direction of vehicle width, and the lower part 42*b* diagonally extends from a lower part of the part fixed to the vehicle body downward and outside in the direction of vehicle width functions as a stand supporting part. The lower part 42*b* of the side stand bracket 42 is held in the forked base of the side stand 41 in a direction of its thickness, in this state, the pivot bolt 44 pieces the lower part and the base, and the pivot bolt turnably couples them.

As shown in FIGS. 2 and 4, a main stand (a center stand) 45 that supports the vehicle body in an upright state is provided in the lower part of the vehicle body.

The main stand 45 is mainly configured by a pair of left and right legs 45*a*, 45*b* and a cross member 45*c* that couples respective intermediate parts of the left and right legs 45*a*, 45*b*. Bases of the left and right legs 45*a*, 45*b* are turnably coupled to both ends of a main stand support 46 formed at a lower end of the pivot frame 9 by a lateral pivot bolt 47 and accordingly, the main stand 45 is turnably (storably) supported by the main stand support 46. FIG. 2 shows a stored state in which the side of an end of the main stand 45 is sprung up backward. As illustrated in FIG. 4, left and right legs 45*a*', 45*b*' are shown in a state in which the main stand 45 is upright (a vehicle body supporting state).

The left and right legs 45*a*, 45*b* are provided with an interval between the sides of the respective ends wider. A stand operating arm 45*d* extends from the outside of the end of the left leg 45*a* and a stand return spring 45*e* is arranged outside the base of the left leg 45*a*.

As shown in FIG. 1, a front cowl 34 that covers the circumference of the head pipe 6 from the front side across both sides is provided to the front of the vehicle body. A headlight 35 is arranged at a front end of the front cowl 34, each front winker 36 is arranged on both sides of a lower part of the front cowl 34, a meter unit 37 is arranged inside an upper part of the front cowl 34, and each rear view mirror 38 is arranged on both sides of the upper part of the front cowl 34. A windscreen 34*a* is provided and a front fender 85 covers an upper part of the front wheel 2.

As shown in FIGS. 3 to 5, the motorcycle 1 is provided with an exhaust device 50 that varies the area of a flow path in the exhaust pipe 22 (the collecting pipe 22*b*, the connecting pipe 23*a* at the front end in this embodiment).

The exhaust device 50 is mainly configured by an exhaust valve 51 built in the exhaust pipe 22 (in the connecting pipe 23*a* at the front end) and an actuator 55 for driving the exhaust valve 51.

The exhaust valve 51 is a butterfly valve provided with a turning shaft 52 which radially pierces the connecting pipe at the front end 23*a*. The turning shaft 52 is tilted so that the inside in the direction of vehicle width is located up and a driven pulley 53 adjacently arranged inside the connecting pipe 23*a* at the front end in the direction of vehicle width is fixed to an inner end in the direction of vehicle width of the turning shaft 52. The driven pulley 53 is covered with a housing 54 integrated with the inside in the direction of vehicle width of the connecting pipe 23*a* at the front end. One end of the two driving cables (hereinafter merely called cables) 59 extend from the actuator 55 and are connected to the driven pulley 53.

The actuator 55 is located on the downside of the front of the swing arm 14 in a side view of the vehicle body and is provided with the actuator biased on the left side based upon the center line CL of the vehicle body in a bottom view of the vehicle body. More specifically, the actuator 55 is located between the center line CL of the vehicle body and the left arm 14*a* of the swing arm 14 in the lateral direction in the bottom view of the vehicle body and is located between the cross member 14*c* of the swing arm 14 and the pivot frame 9 in the longitudinal direction. In the meantime, the exhaust valve 51 (the connecting pipe 23*a* at the front end, the collecting pipe 22*b*) is provided with the exhaust valve biased on the right side based upon the center line CL of the vehicle body in the bottom view of the vehicle body.

The actuator 55 is mainly configured by a servo motor 56 provided with a driving shaft 57 arranged substantially vertically and a driving pulley 58 fixed to an upper end of the driving shaft 57. The other end of each cable 59 is connected to the driving pulley 58, the driving force of the servo motor 56 is transmitted to the exhaust valve 51 via each cable 59, and the driving force normally and reversely rotates the exhaust valve.

After each cable 59 extends backward from the driving pulley 58 at an upper end of the actuator 55 biased on the left side of the vehicle body, it extends to the right, being suitably curved on the downside of the cross member 14*c* of the swing arm 14 and is coupled to the driven pulley 53 arranged inside the exhaust pipe 22 on the right side of the vehicle body in the direction of vehicle width from the front side and from the inside in the direction of vehicle width.

The actuator 55 (the servo motor 56) is supported by the left side of a lower part of the body frame 5 via a servo motor stay 60.

Figure 6:
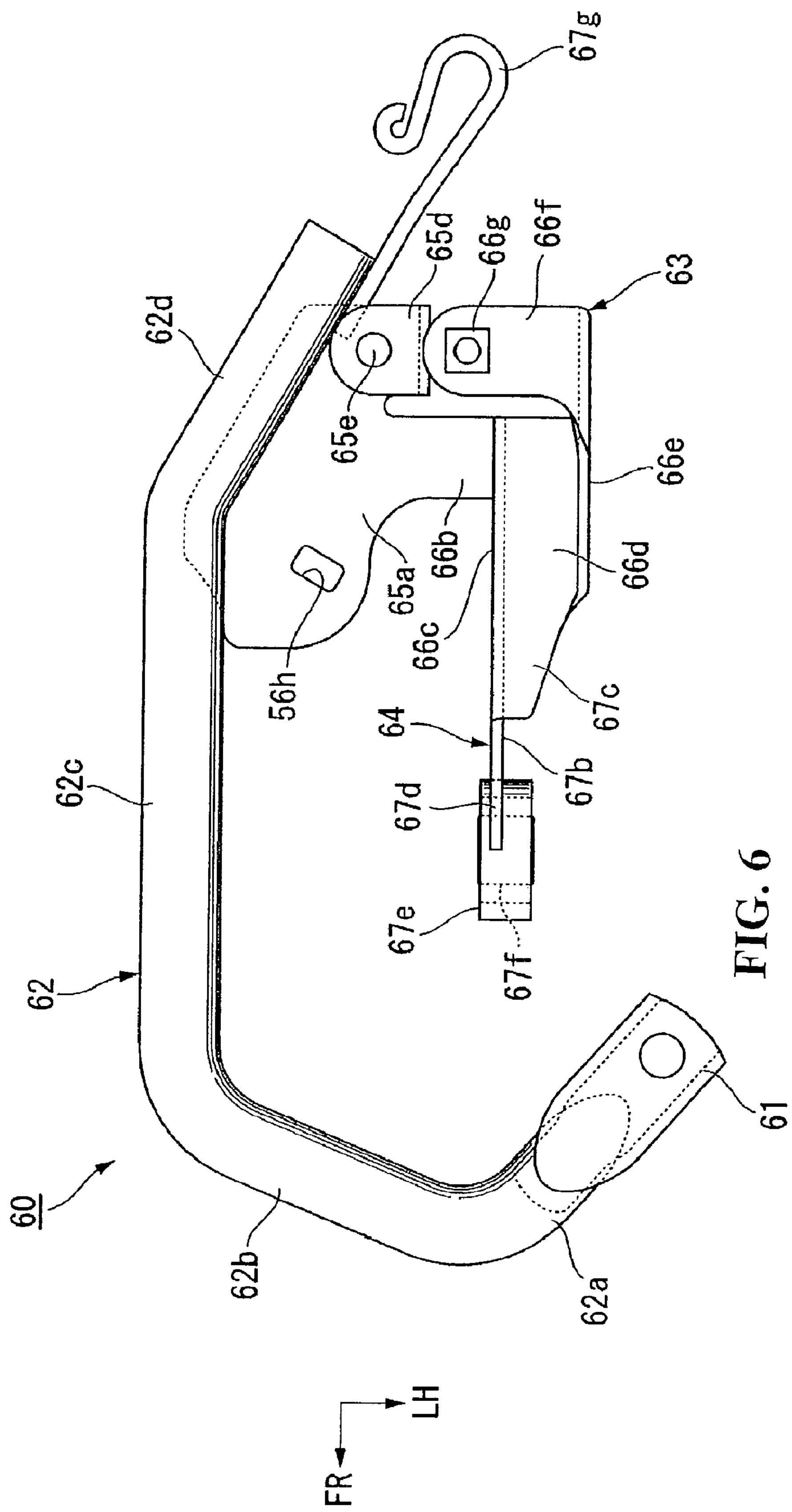
FIG. 6 is a top view showing a servo motor stay of the exhaust device.
Figure 7:
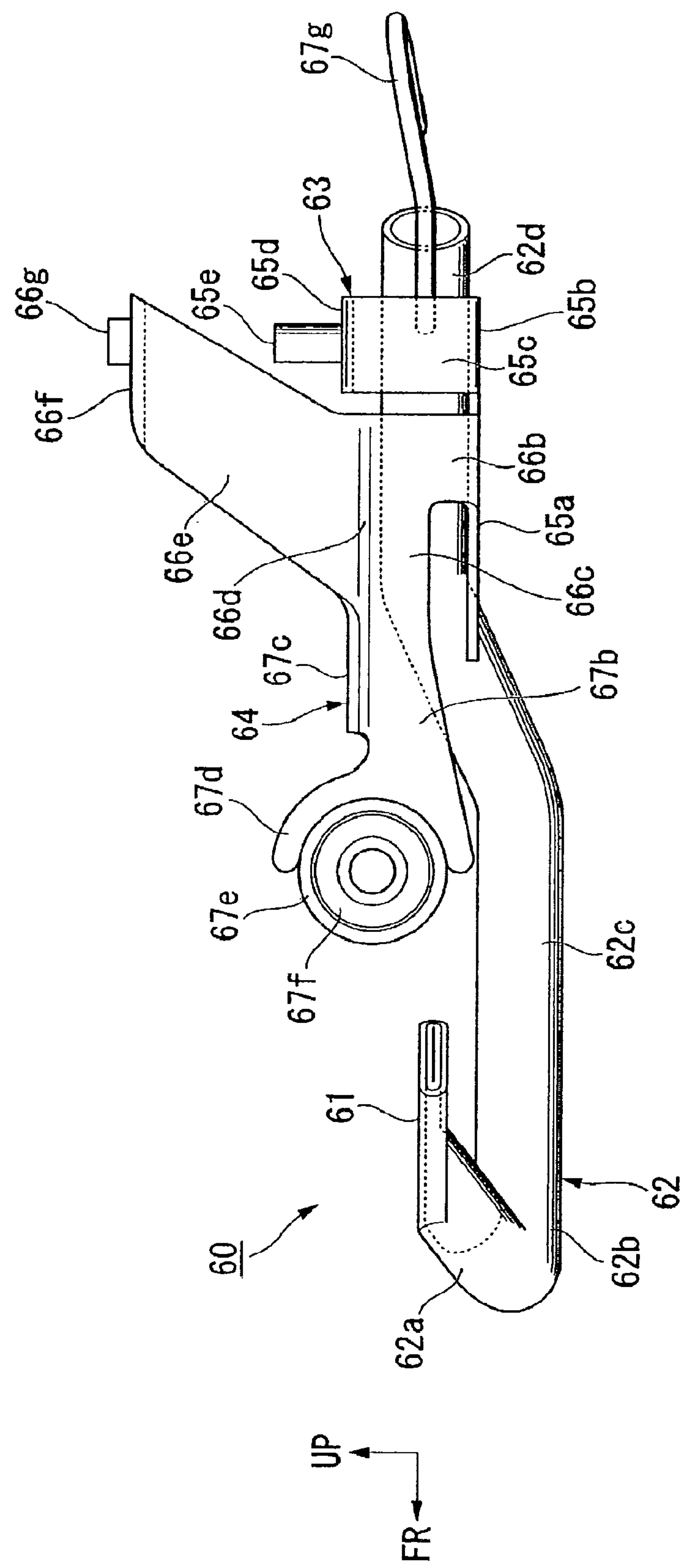
FIG. 7 is a left side view showing the servo motor stay.

As also shown in FIGS. 6 and 7, the servo motor stay 60 is formed by integrating plural steel plates by welding and by other means. The servo motor stay is mainly configured by a beam part 62 extending forward from a part 61 fastened to the vehicle body (hereinafter merely called a fastened part) fastened to a bottom of the left pivot bracket 12 and extending backward, detouring inside in the direction of vehicle width, a servo motor attachment (hereinafter merely called a motor attachment) 63 provided to the rear of the beam part 62 and a detent 64 extending forward from the motor attachment 63 and coupled to a left end of the main stand support 46 at the lower end of the pivot frame 9.

The beam part 62 is formed by bending a round steel pipe. The outside in the direction of vehicle width of the front of the beam part 62 has double pipe structure in which an inner pipe is built and the flat and substantially horizontal fastened part 61 is formed by vertically pressing and squashing the part.

The beam part 62 is provided with a front outside-extending part 62*a* diagonally extending forward from the fastened part 61 and inside in the direction of vehicle width, a front inside-extending part 62*b* diagonally extending backward from an inner end in the direction of vehicle width of the front outside-extending part 62*a* and inside in the direction of vehicle width, an intermediate extending part 62*c* extending backward from an inner end in the direction of vehicle width of the front inside-extending part 62*b* along the center line CL of the vehicle body and a rear extending part 62*d* diagonally extending backward from a rear end of the intermediate extending part 62*c* and outside in the direction of vehicle width.

The front outside-extending part 62*a* is provided in a tilted state in which the outside in the direction of vehicle width is located up so that the fastened part 61 is displaced on the respective upsides of the substantially horizontal front inside-extending part 62*b* and the substantially horizontal front of the intermediate extending part 62*c*. The rear of the intermediate extending part 62*c* is provided in a state in which the rear is gently cranked in a side view so that the rear extending part 62*d* is displaced on the upside of the substantially horizontal front. The rear extending part 62*d* is substantially horizontally provided.

The motor attachment 63 is formed by bending a steel plate. The motor attachment 63 is provided with a flat lower horizontal plate 65*a* substantially horizontally extending outside in the direction of vehicle width from a lower edge of the beam part 62 across the rear of the intermediate extending part 62*c* and the rear extending part 62*d*, a rear extending part 65*b* extending outside in the direction of vehicle width from an outer end in the direction of vehicle width of the rear of the lower horizontal plate 65*a*, a rear vertical plate 65*c* substantially vertically extending upward from an outer end in the direction of vehicle width of the rear extending part 65*b* and a rear horizontal plate 65*d* substantially horizontally extending inside in the direction of vehicle width from an upper end of the rear vertical plate 65*c*.

In addition, the motor attachment 63 is provided with an intermediate extending part 66*b* extending outside in the direction of vehicle width from an outer end in the direction of vehicle width of a longitudinal intermediate part of the lower horizontal plate 65*a*, a vertical plate 66*c* substantially vertically extending upward from an outer end in the direction of vehicle width of the intermediate extending part 66*b*, a middle horizontal plate 66*d* substantially horizontally extending outside in the direction of vehicle width from an upper end of the vertical plate 66*c*, an upper vertical plate 66*e* substantially vertically extending upward from an outer end in the direction of vehicle width of the middle horizontal plate 66*d* and an upper horizontal plate 66*f* substantially horizontally extending inside in the direction of vehicle width from an upper end of the upper vertical plate 66*e*.

The intermediate extending part 66*b* is tilted so that the outside in the direction of vehicle width is located up. The longitudinal width of the vertical plate 66*c* is increased forward, compared with that of the intermediate extending part 66*b*. The upper vertical plate 66*e* extends with the upper vertical plate tilted so that the upside is located in the rear in a side view. A weld nut 66*g* is joined to a top face of the upper horizontal plate 66*f* and a lower end of a locking pin 65*e* protruded upward is joined to the rear horizontal plate 65*d*. Each longitudinal width of the upper horizontal plate 66*f* and the rear horizontal plate 65*d* is substantially equal, each central position of the weld nut 66*g* and the locking pin 65*e* is substantially equal in the longitudinal direction, and further, the locking pin 65*e* is provided with the locking pin displaced inside in the direction of vehicle width for the weld nut 66*g*.

A front extending part 67*b* is provided in front of the vertical plate 66*c* and an upper extending part 67*c* is provided in front of the middle horizontal plate 66*d*. A round pipe joint 67*d* in the shape of a semicircle in a side view is provided to a front end of the front extending part 67*b* and the periphery of a cylindrical short pipe 67*e* extending in the direction of the vehicle width is joined to an inner face of the round pipe joint 67*d*. A cylindrical pipe bush (rubber bush) 67*f* similarly extending in the direction of the vehicle width is fitted and held into the short pipe 67*e*. The detent 64 is configured by the front extending part 67*b*, the upper extending part 67*c*, the round pipe joint 67*d*, the short pipe 67*e* and the pipe bush 67*f*. A central position of the pipe bush 67*f* is located up in a side view, compared with the fastened part 61 and is located at the back of the fastened part 61 and inside the fastened part in the direction of vehicle width in a bottom view.

As shown in FIGS. 3 to 5, a substantially horizontal thick lower supported part 56*a* and an intermediate supported part 56*c* respectively protruding backward are provided to a lower end and to a vertically intermediate part respectively on the rear side of the actuator 55 (the servo motor 56). The locking pin 65*e* of the rear horizontal part 65*d* pierces the lower supported part 56*a* via a rubber bush 56*b* from the downside and thereby, the lower supported part 56*a* is elastically supported on the rear horizontal plate 65*d*. In the meantime, a bolt screwed to the weld nut 66*g* of the upper horizontal plate 66*f* pierces the intermediate supported part 56*c* via a rubber bush 56*d* from the downside and thereby, the intermediate supported part 56*c* is elastically supported under the upper horizontal plate 66*f*. Thus, the actuator 55 is mounted on the motor attachment 63 via rubber.

A front end (the pipe bush 67*f*) of the detent 64 is adjacent to the left end of the main stand support 46 at the lower end of the pivot frame 9 and the front end of the detent 64 is elastically supported by the lower end of the pivot frame 9 by making the pivot bolt 47 of the main stand 45 pierce and support the pipe bush 67*f*.

In such an attachment, the servo motor 56 is arranged so that the servo motor is overlapped with the left side of the lower part of the pivot frame 9 in a rear view and is arranged between the exhaust pipe 22 and the swing arm 14 in a side view.

The servo motor 56 is supported by the body frame 5 mainly via the cantilever-type beam part 62 a front end of which is fastened and fixed to the body frame 5, however, as the rear of the beam part 62 is elastically supported by the body frame 5 via the motor attachment 63 formed by bending a plate member and the detent 64, the whirl of the servo motor stay 60 is stopped and the vibration of the rear (a circumference of the servo motor 56) of the servo motor stay 60 is inhibited. As the servo motor 56 is mounted on the servo motor stay 60 via rubber, the transmission to the servo motor stay 60 of the vibration of the servo motor 56 is also inhibited.

The beam part 62 of the servo motor stay 60 is arranged between the left and right legs 45*a*, 45*b* of the main stand 45. Thus, the turning of the main stand 45 is prevented from being obstructed by the servo motor 56 and the servo motor stay 60 and the servo motor 56 is arranged in dead space on the upside of the main stand 45 and between the left and right legs 45*a*, 45*b*.

A servo motor cover (hereinafter merely called a motor cover) 69 made of an elastic member such as rubber is detachably mounted on the actuator 55. The motor cover 69 covers the outside faces of most except the supported parts 56*a*, 56*c* and others of the servo motor 56 via predetermined interference and turnably covers the driving pulley 58 via predetermined clearance. Thus, an effect of disturbance on the actuator 55 arranged in the lower part of the vehicle body is reduced owing to the motor cover 69. A weight 70 supported by a circumference of a lower end of a left pivot plate is arranged outside the actuator 55 in the direction of vehicle width and as the actuator is covered with the weight 70 from the outside in the direction of vehicle width, the effect of disturbance on the actuator 55 is also reduced.

A front end of a cable holder 67*g* formed by bending a wire-like steel product so as to hold each cable 59 extending from the servo motor 56 is joined to a rear end of the beam part 62. A clip 56*g* is provided to a bottom of a coupler 56*f* at an end of a power supply harness 56*e* extending from the servo motor 56, and a clip hole 56*h* for engaging the clip 56*g* is formed in the front of the lower horizontal plate 65*a* of the motor attachment 63.

Figure 8:
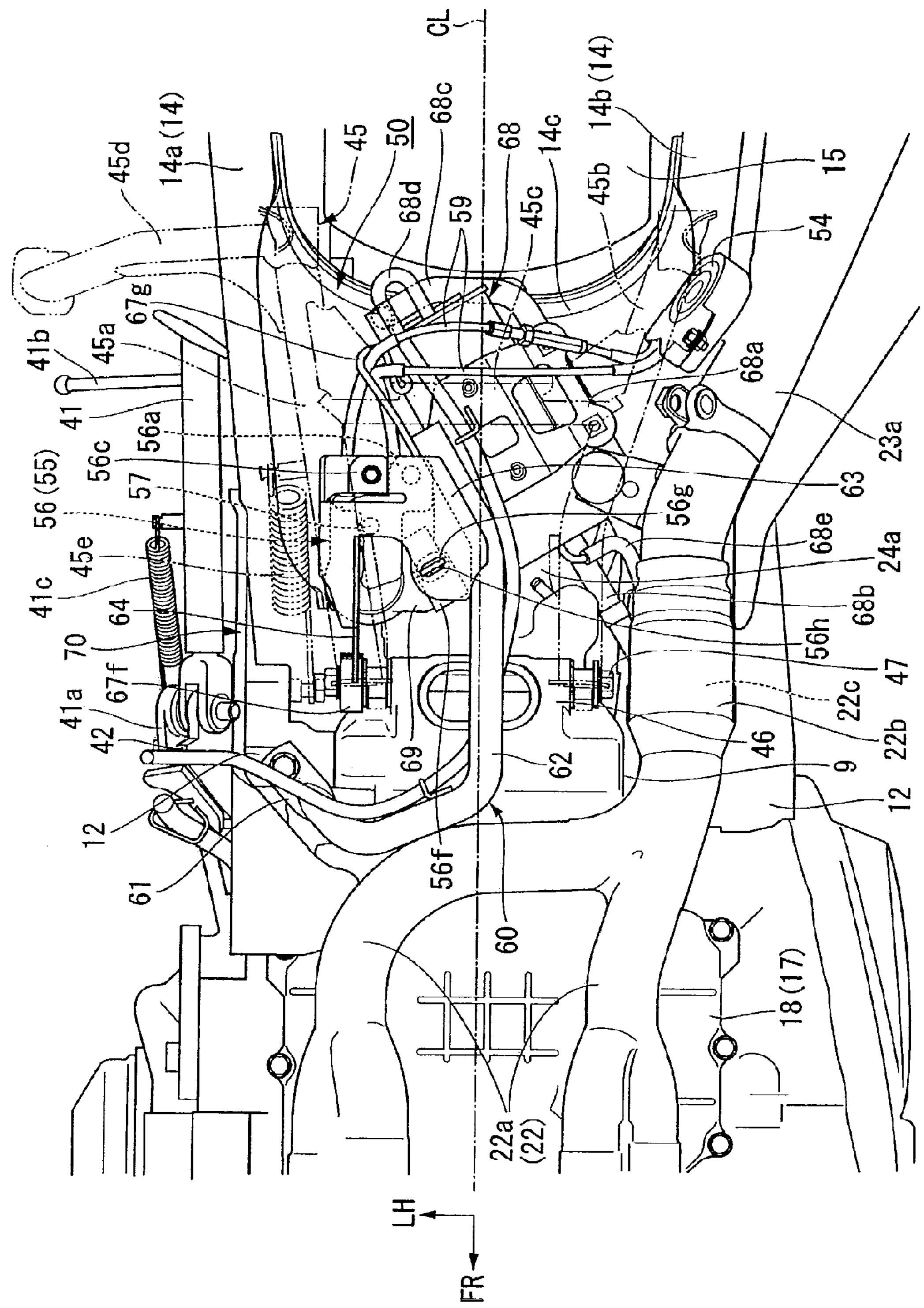
FIG. 8 is a bottom view equivalent to FIG. 4 showing an example that a canister is supported by the servo motor stay.

FIG. 8 shows an example wherein a canister 68 is supported by the rear of the servo motor stay 60 together with the servo motor 56 as a transformed example of this embodiment.

The canister 68 is evaporated fuel treating equipment that scavenges fuel gas evaporated in the fuel tank 31, absorbs fuel evaporated in the fuel tank 31, while the canister supplies the absorbed fuel to an intake path when the engine 17 is operated so as to combust the fuel in the cylinder 19. The canister 68 has substantially a cylindrical appearance and is adjacently arranged along the rear extending part 62*d* of the beam part 62.

A canister supporting plate 68*a* is joined to the right side of the rear extending part 62*d* across the center line CL of the vehicle body and the canister 68 is supported on the canister supporting plate 68*a*. A reference sign 68*b* in the drawing denotes a fuel supply hose (a purge hose) to the intake path, 68*c* denotes an open hose that makes a fuel absorbing part in the canister 68 and the air communicate, 68*d* denotes a drain hose, and 68*e* denotes a hose for taking in evaporated fuel from the fuel tank 31 (a charge hose).

Figure 9:
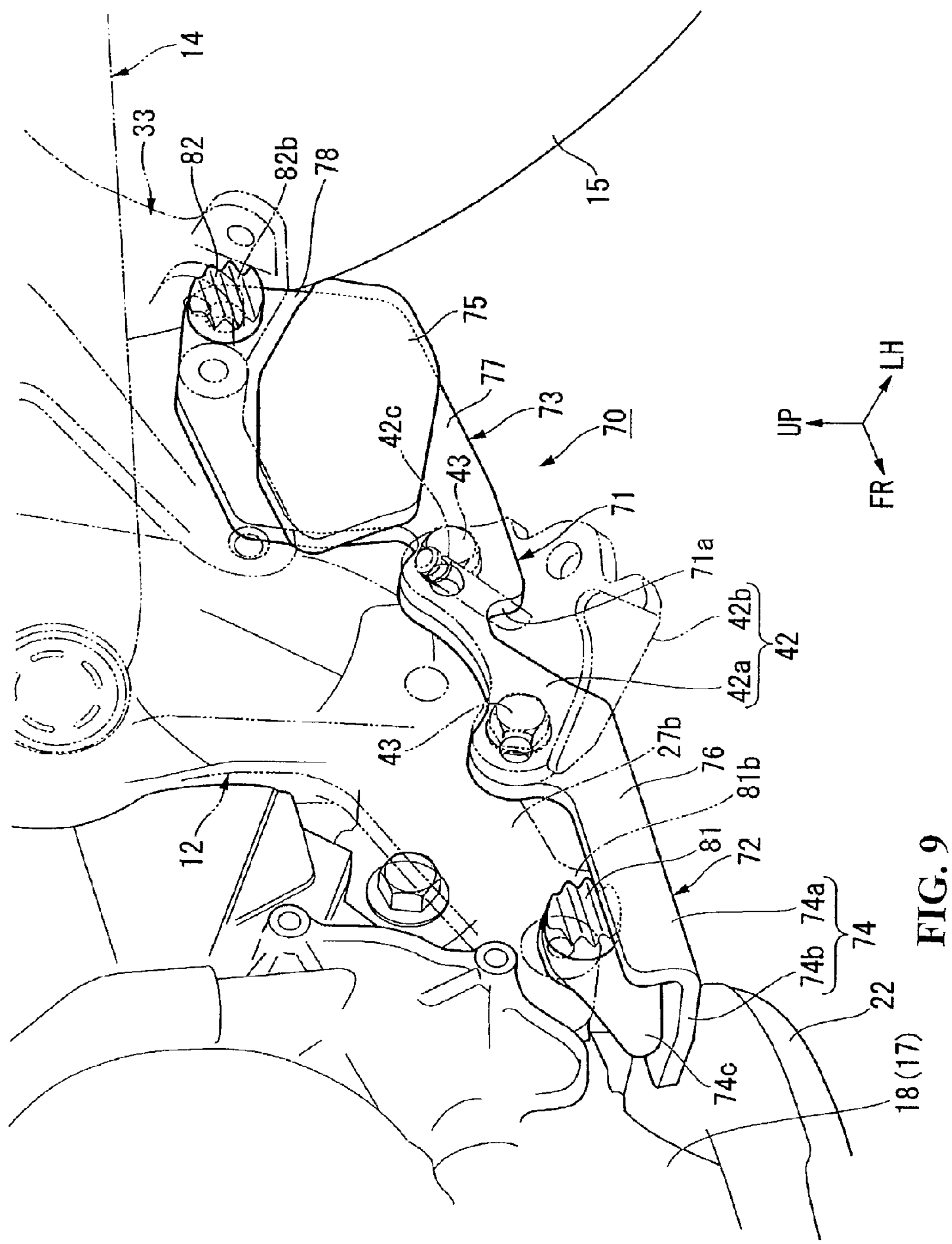
FIG. 9 is a perspective view showing a circumference of a weight on the left side of a lower part of a vehicle body of the motorcycle.
Figure 10:
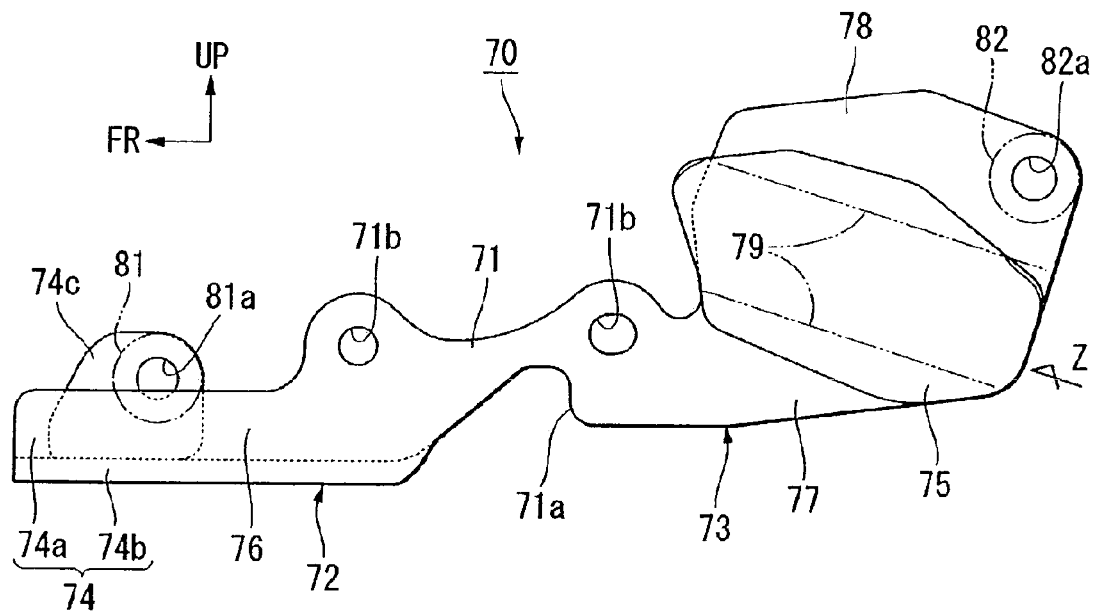
FIG. 10 is a left side view showing the weight.
Figure 11:
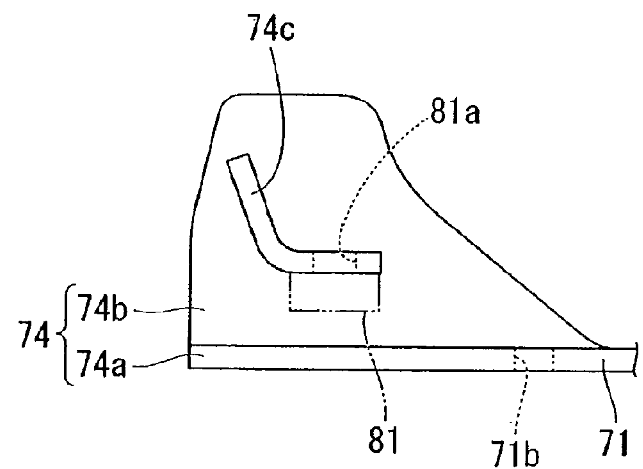
FIG. 11 is a top view showing a main part of the weight.
Figure 12:
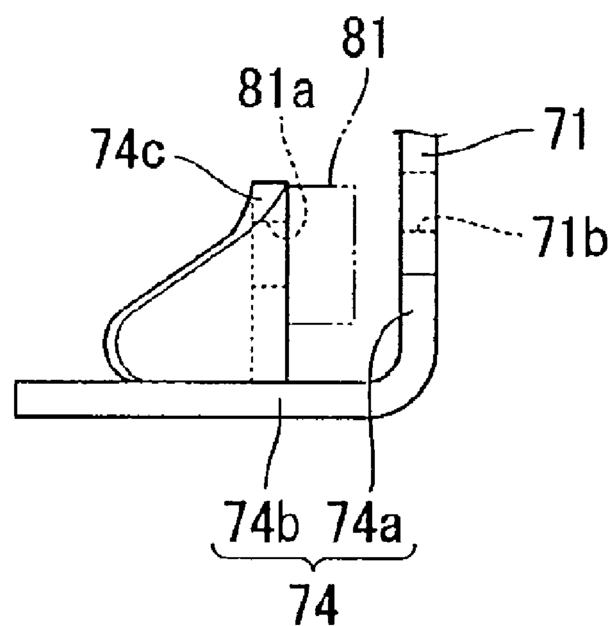
FIG. 12 is a front view showing the main part of the weight.
Figure 13:
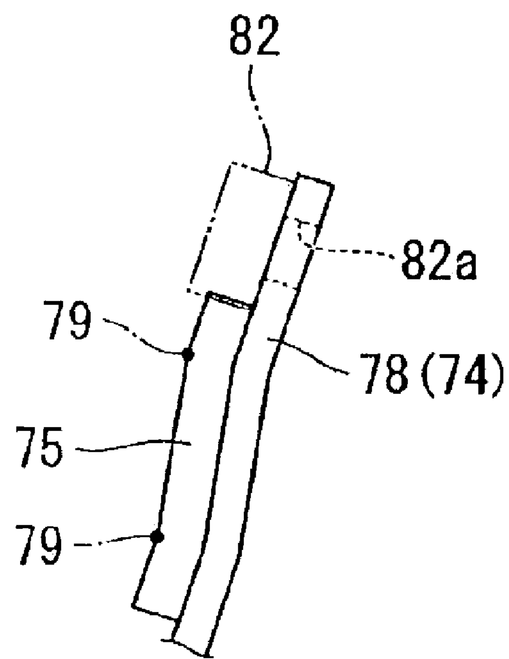
FIG. 13 is a view viewed from a direction shown by an arrow Z in FIG. 10.

As shown in FIGS. 2 and 9, the flat weight 70 substantially perpendicular to the lateral direction is arranged outside the servo motor 56 in the direction of vehicle width.

The weight 70 is fastened and fixed to the lower end of the left pivot bracket 12 together with the side stand bracket 42 and is provided with a part attached to the vehicle body 71 having a hole 71*b* for inserting the bolt 43, a front overhang 72 extending in front of the part attached to the vehicle body and a rear overhang 73 extending at the back of the part attached to the vehicle body.

As also shown in FIGS. 10 to 13, the weight 70 is mainly configured by a main plate member 74 from a front end of the weight to a rear end and a subplate member 75 integrated with the outside in the direction of vehicle width of the rear (the rear overhang 73) of the main plate member 74.

The main plate member 74 is formed by bending a thick steel plate and is provided with a vertical wall 74*a* substantially perpendicular to the lateral direction and a lateral wall 74*b* substantially horizontally extending inside in the direction of vehicle width from a lower edge of the front of the vertical wall 74*a*. The part attached to the vehicle body 71 is equivalent to a longitudinal intermediate part (a longitudinal intermediate part of the weight 70) of the vertical wall 74*a*. A downward recessed portion 71*a* for avoiding a spring locking pin 42*c* of the side stand bracket 42 is formed at a lower edge of the part attached to the vehicle body 71. An upper edge of the part attached to the vehicle body 71 is formed into a recessed shape along a contour of the lower end of the left pivot bracket 12.

A front extending part 76 is connected in front of a lower part of the part attached to the vehicle body 71 and the substantially trapezoidal lateral wall 74*b* in a top view is substantially horizontally extending inside in the direction of vehicle width from a lower edge of the front extending part 76. In the meantime, a rear extending part 77 is connected at the back of the part attached to the vehicle body 71 and a substantially square upper extending part 78 in a side view is connected on the upside of the rear extending part 77. The subplate member 75 is joined across the upper extending part and the rear extending part outside the upper extending part 78 and the rear extending part 77 in the direction of vehicle width. The upper extending part 78, the rear extending part 77 and the subplate member 75 are gently cranked so that each upper part is displaced outside in the direction of vehicle width so as to form upper and lower bent lines 79 the rears of which are located up.

The front overhang 72 is elastically supported by the left pivot bracket 12 by touching the front overhang to the lower end of the left pivot bracket 12 via a front rubber member 81 from the inside in the direction of vehicle width. In the meantime, the rear overhang 73 is elastically supported by the left step bracket 33 by touching the rear overhang to the left step bracket 33 via a rear rubber member 82 from the inside in the direction of vehicle width.

A slightly projecting and V-type front supporting bracket 74*c* is joined to a top face of the lateral wall 74*b* in the front and outside in the direction of vehicle width in a top view and a front mounting hole 81*a* for mounting the front rubber member 81 is formed on the sidewall substantially perpendicular to the direction of vehicle width of the front supporting bracket 74*c*. In the meantime, a rear mounting hole 82*a* for mounting the rear rubber member 82 is formed on the rear side of an upper part of the upper extending part 78.

Figure 14:
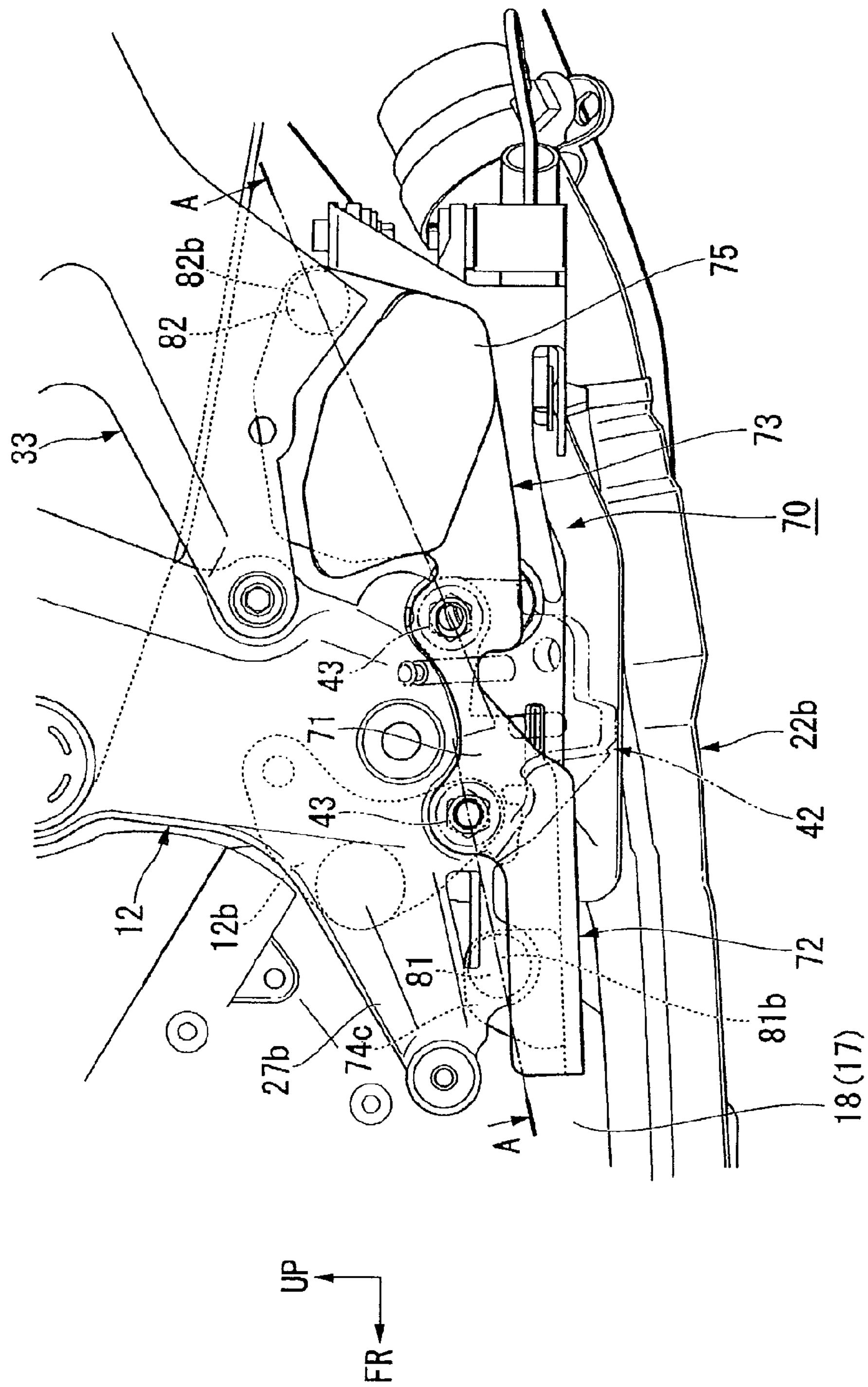
FIG. 14 is a left side view showing the circumference of the weight.
Figure 15:
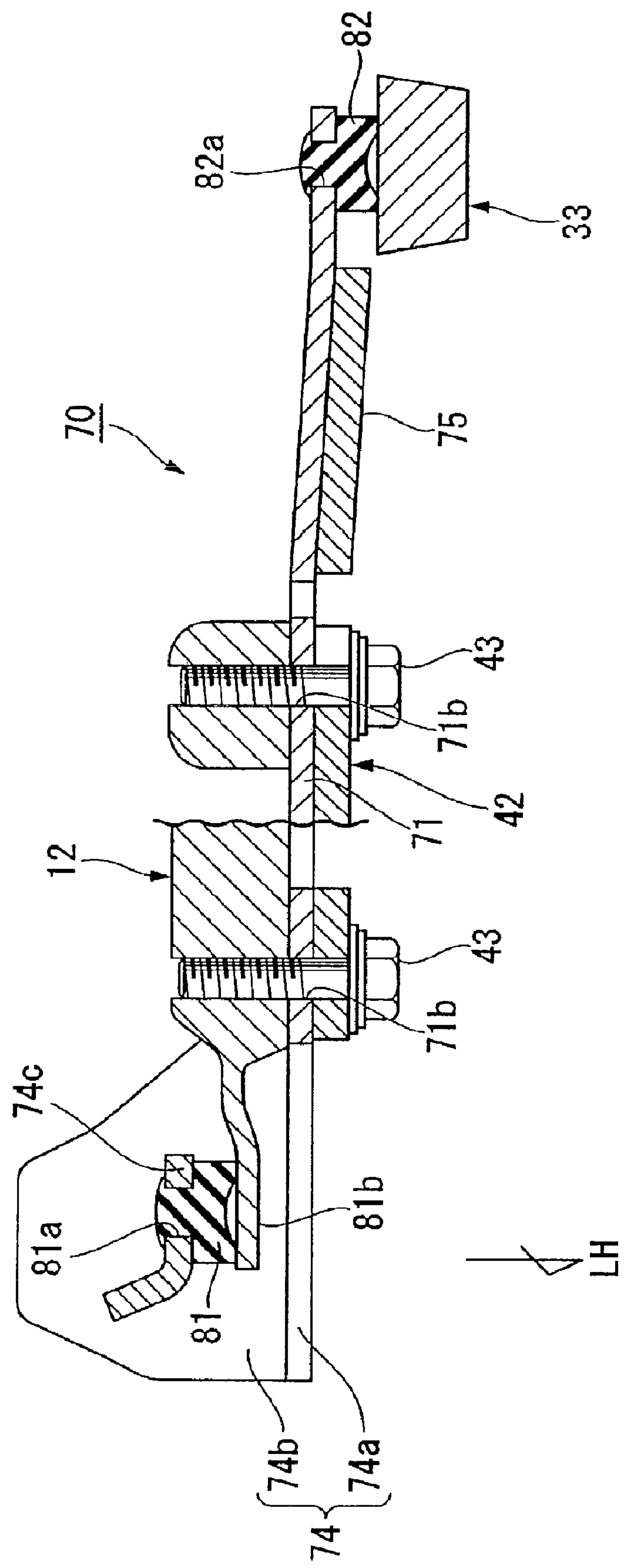
FIG. 15 is a sectional view viewed along a line A-A in FIG. 14.

As shown in FIGS. 14 and 15, the weight 70 is supported by the left side of the lower part of the vehicle body by jointly fastening the part attached to the vehicle body 71 to the lower end of the left pivot bracket 12 together with the side stand bracket 42 in a state in which the part attached to the vehicle body is held between the lower end of the left pivot bracket 12 and the upper part 42*a* of the side stand bracket 42, by pressure-welding the front rubber member 81 to a front cushion pressing part 81*b* formed on the front side of the lower end of the left pivot bracket 12 from the inside in the direction of vehicle width and by pressure-welding the rear rubber member 82 to a rear cushion pressing part 82*b* on the downside of the front 33*a* of the left step bracket 33 from the inside in the direction of vehicle width.

Thus, in the weight 70 provided with the front and rear overhangs 72, 73 extending before and after the part attached to the vehicle body 71, the vibration of the front and rear overhangs 72, 73 can be effectively inhibited when its weight is secured without increasing the number of parts fixed to the vehicle body.

An upper edge of the subplate is formed into a recessed shape along a lower edge of the front 33*a* located just up of the left step bracket 33 and contributes to the formation of the integral appearance in a side view of a circumference of the weight 70 and securing the weight.

Figure 16:
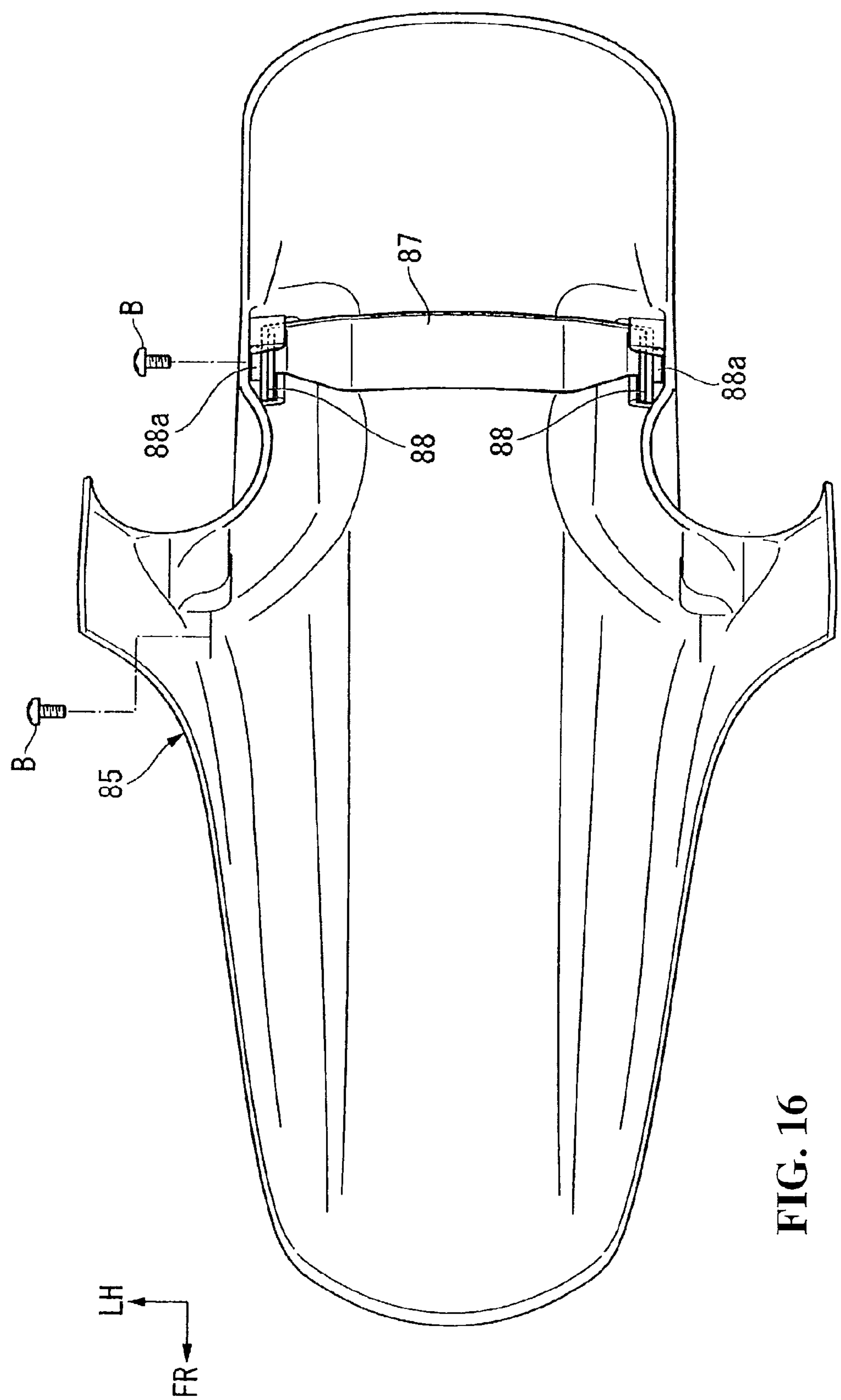
FIG. 16 is a bottom view showing a front fender of the motorcycle.
Figure 17:
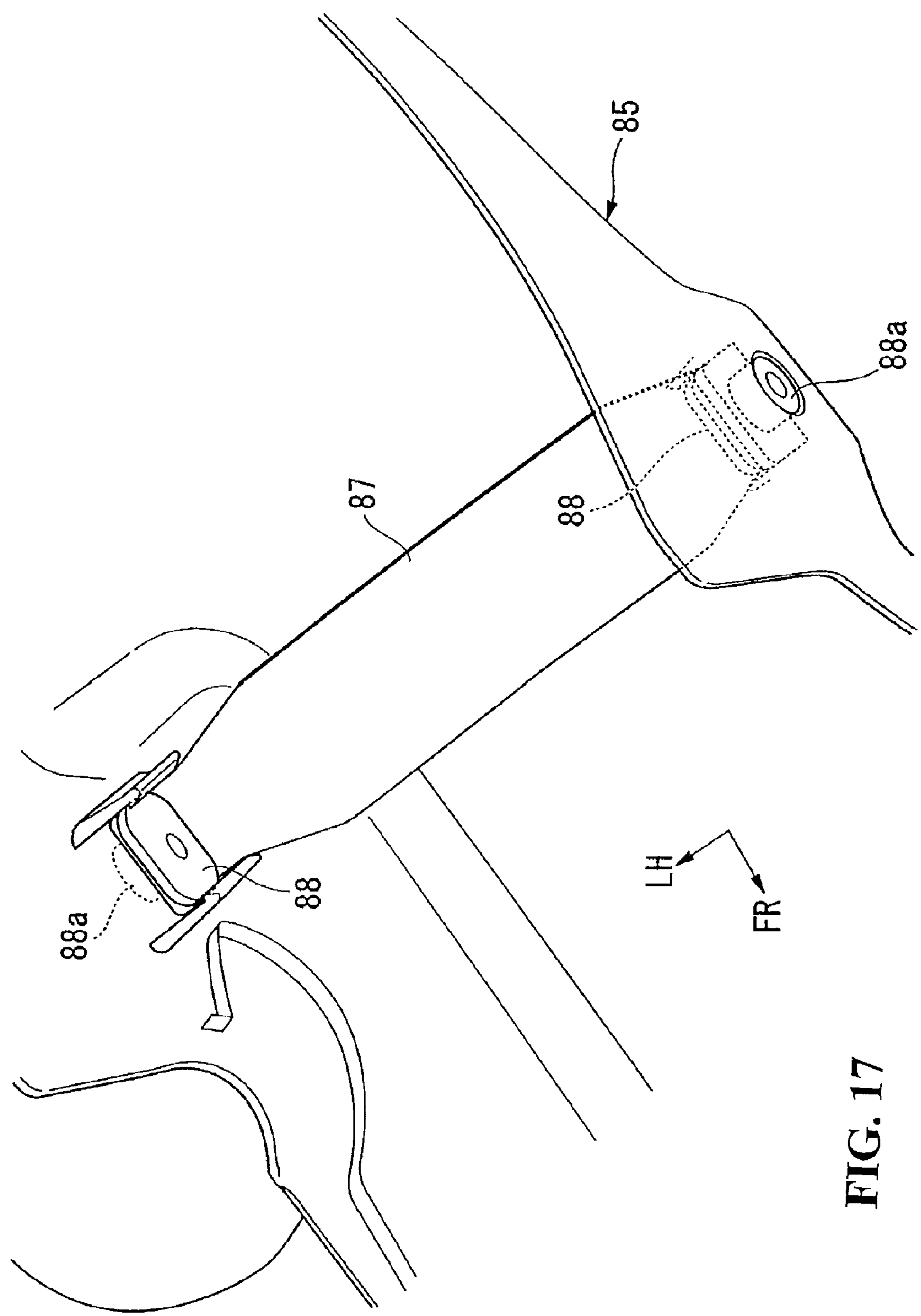
FIG. 17 is a perspective view showing the inside of the front fender.

As shown in FIGS. 16 and 17, the front fender 85 is fastened and fixed to the front and the rear of an upper end of each bottom case (each outer tube) of the right and left front forks 3 by front and rear bolts B. Inside the front fender 85, a reinforcing stay 87 that couples the rears of the right and left front forks 3 is provided. The reinforcing stay 87 is made of iron and steel differently from the synthetic resin front fender 8, is a band laid between the right and left front forks 3, and is curved along the tread of the front wheel 2 (an inner face of the front fender 85). Right and left ends of the reinforcing stay 87 are in the shape of a plate substantially perpendicular to the lateral direction and each collar 88*a* of right and left nuts 88 pierces each right and left end. The reinforcing stay 87 is fixed together with the front fender 85 in a state in which the reinforcing stay couples the right and left front forks 3 by screwing the rear bolt into the collar 88*a* from the outside in the direction of vehicle width and tightening it.

As described above, the servo motor layout structure of the saddle-ride type vehicle in this embodiment is applied to the motorcycle 1 provided with the engine 17 supported by the body frame 5, the swing arm 14 the front end of which is swingably supported by at least either of the body frame 5 or the engine 17 and the rear end of which journals the rear wheel 15, the exhaust pipe 22 connected to the engine 17, the exhaust valve 51 provided in the exhaust pipe 22, the servo motor 56 that drives the exhaust valve 51 and the cable 59 that couples the exhaust valve 51 and the servo motor 56, and the exhaust valve 51 and the servo motor 56 are arranged on the downside of the swing arm 14 in the side view.

According to this configuration, the length and the curvature of the cable 59 that couples the exhaust valve 51 and the servo motor 56 can be inhibited, arranging the exhaust valve 51 and the servo motor 56 in the dead space on the downside of the swing arm 14.

In addition, the servo motor layout structure is provided with the servo motor stay 60 that supports the servo motor 56 by the body frame 5, and the servo motor stay 60 is provided with the beam part 62 the front of which is fastened to the lower part of the body frame 5, the servo motor attachment 63 provided to the rear of the beam part 62 and the detent 64 extending forward from the servo motor attachment 63 and coupled to the lower part of the body frame 5 at the back of the part 61 fastened to the vehicle body of the beam part 62.

According to this configuration, though the servo motor 56 is required to be supported by a cantilever if no supporting part is especially formed on the body frame 5 when the servo motor 56 is arranged on the downside of the swing arm 14, the servo motor 56 can be stably and securely supported by the body frame 5 by using the servo motor stay 60 provided with the beam part 62 and the detent 64 positions for mounting them on the body frame 5 of which are different in the longitudinal direction.

In addition, in the servo motor layout structure, the main stand support 46 that journals the main stand 45 is provided to the lower part of the body frame 5 and the detent 64 of the servo motor stay 60 is fastened to the stand swinging shaft (the pivot bolt 47) in the main stand support 46 via the pipe bush 67*f*.

According to this configuration, even if no mounting part is separately provided to the body frame 5, the detent 64 can be coupled to the main stand support 46. As the detent 64 is elastically supported via the pipe bush 67*f* even if the servo motor stay 60 is vertically vibrated due to irregularities of a road surface and others, vibration transmitted to the main stand support 46 can be reduced and a state in which the detent 64 is supported can be more securely maintained.

In addition, in the servo motor layout structure, the main stand 45 is provided with the pair of left and right legs 45*a*, 45*b*, the beam part 62 of the servo motor stay 60 is longitudinally extending passing between the left and right legs 45*a*, 45*b*, the front is curved on one side in the direction of vehicle width in front of the main stand support 46, and the front is fastened to the bottom of the body frame 5.

According to this configuration, even if the main stand 45 is being used or is stored, the servo motor stay 60 can be attached to the body frame 5 with the beam part 62 avoiding the left and right legs 45*a*, 45*b*.

In addition, in the servo motor layout structure, the servo motor stay 60 is provided with the plate member (the servo motor attachment 63) made by bending a steel plate, the plate member is provided with the substantially horizontal lower horizontal plate 65*a*, the vertical plates 65*c*, 66*c* substantially vertically bent from one side edge of the lower horizontal plate 65*a*, the pipe bush mounting part (the round pipe joint 67*d*, the short pipe 67*e*) provided in front of the vertical plates 65*c*, 66*c* and the horizontal plates 65*d*, 66*f* substantially horizontally bent from each upper edge of the vertical plates 65*c*, 66*c*, a part (66*c*) of the vertical plates 65*c*, 66*c* is extending forward to form the detent 64, and the servo motor 56 is mounted on the horizontal plates 65*d*, 66*f* via rubber.

According to this configuration, the servo motor stay 60 can be provided at a low cost with a simple configuration by bending the plate member and forming the detent 64 and the rubber mounting part (the horizontal plates 65*d*, 66*f*) for the servo motor 56. As the detent 64 is made of the plate, it is not bulky and the servo motor stay 60 can be compacted.

In addition, in the servo motor layout structure, the coupler locking hole (the clip hole 56*h*) for locking the coupler check member (the clip 56*g*) provided to the coupler 56*f* of the servo motor 56 is provided to the lower horizontal plate 65*a*.

According to this configuration, as the lower horizontal plate 65*a* is made of a plate, the coupler locking hole can be easily provided.

In addition, in the servo motor layout structure, the canister supporting plate 68*a* is further provided to the servo motor stay 60.

According to this configuration, the canister 68 can be also supported by the servo motor stay 60 in the dead space under the swing arm 14.

In addition, in the servo motor layout structure, the rubber servo motor cover 69 is mounted on the servo motor 56.

According to this configuration, an effect of disturbance such as a splash from a road surface on the servo motor 56 arranged under the swing arm 14 can be inhibited.

Further, in the servo motor layout structure, the weight 70 is provided to the body frame 5 with the weight covering the side of the servo motor 56.

According to this configuration, the weight 70 excellent in strength and rigidity can also function as a cover that covers the side of the servo motor 56.

Furthermore, in the servo motor layout structure, the servo motor 56 is provided with the servo motor biased on one side based upon the center line CL of the vehicle body in the bottom view of the vehicle body and the exhaust valve 51 is provided with the exhaust valve biased on the other side based upon the center line CL of the vehicle body in the bottom view of the vehicle body.

According to this configuration, the servo motor 56 is separated from the exhaust pipe 22 (the collecting pipe 22*b*) and the heat of the exhaust pipe 22 can be prevented from having an effect on the servo motor 56.

This invention is not limited to the above-mentioned embodiment, for example, this invention can be also applied to a three-wheeled or four-wheel saddle-ride type vehicle in addition to a motorcycle, and it need scarcely be said that various changes are allowed in a range in which they do not deviate from the substance of this invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Servo motor layout structure for a vehicle comprising:
an engine supported by a body frame;
a swing arm a front end of which is swingably supported by at least either of the body frame or the engine and a rear end of which journals a rear wheel;
an exhaust pipe connected to the engine;
an exhaust valve provided in the exhaust pipe;
a servo motor for driving the exhaust valve; and
a cable for coupling the exhaust valve and the servo motor,
wherein the exhaust valve and the servo motor are arranged on the downside of the swing arm in a side view.

2. The servo motor layout structure for a vehicle according to claim 1, comprising a servo motor stay for assisting the servo motor to be supported by the body frame,
wherein the servo motor stay has:
a beam part the front of which is fastened to a lower part of the body frame;
a servo motor attachment provided to the rear of the beam part; and
a detent extending forward from the servo motor attachment and coupled to the lower part of the body frame at the back of a part fastened to a vehicle body of the beam part.

3. The servo motor layout structure for a vehicle according to claim 2, wherein:

a main stand support for journaling a main stand is provided to the lower part of the body frame; and the detent of the servo motor stay is fastened to a stand swinging shaft in the main stand support via a pipe bush.

4. The servo motor layout structure for a vehicle according to claim 3, wherein:

the main stand is provided with a pair of right and left legs;

the beam part of the servo motor stay longitudinally extends and passes between the right and left legs; and the front of the beam part is curved on one side in a direction of vehicle width in front of the main stand support and is fastened to a bottom of the body frame.

5. The servo motor layout structure for a vehicle according to claim 2, wherein:

the servo motor stay is provided with a plate member formed by bending a steel plate;

the plate member is provided with a substantially horizontal lower horizontal plate, a vertical plate substantially vertically bent from one side edge of the lower horizontal part, a pipe bush mounting part provided in front of the vertical plate and an upper horizontal plate substantially horizontally bent from an upper edge of the vertical plate;

the vertical plate extends forward to form the detent; and the servo motor is mounted on the upper horizontal plate via rubber.

6. The servo motor layout structure for a vehicle according to claim 3, wherein:

the servo motor stay is provided with a plate member formed by bending a steel plate;

the plate member is provided with a substantially horizontal lower horizontal plate, a vertical plate substantially vertically bent from one side edge of the lower horizontal part, a pipe bush mounting part provided in front of the vertical plate and an upper horizontal plate substantially horizontally bent from an upper edge of the vertical plate;

the vertical plate extends forward to form the detent; and the servo motor is mounted on the upper horizontal plate via rubber.

7. The servo motor layout structure for a vehicle according to claim 4, wherein:

the servo motor stay is provided with a plate member formed by bending a steel plate;

the plate member is provided with a substantially horizontal lower horizontal plate, a vertical plate substantially vertically bent from one side edge of the lower horizontal part, a pipe bush mounting part provided in front of the vertical plate and an upper horizontal plate substantially horizontally bent from an upper edge of the vertical plate;

the vertical plate extends forward to form the detent; and the servo motor is mounted on the upper horizontal plate via rubber.

8. The servo motor layout structure for a vehicle according to claim 5, wherein a coupler locking hole for locking a coupler check member provided to a coupler of the servo motor is provided to the lower horizontal plate.

9. The servo motor layout structure for a vehicle according to claim 2, wherein a canister mounting part is further provided to the servo motor stay.

10. The servo motor layout structure for a vehicle according to claim 3, wherein a canister mounting part is further provided to the servo motor stay.

11. The servo motor layout structure for a vehicle according to claim 4, wherein a canister mounting part is further provided to the servo motor stay.

12. The servo motor layout structure for a vehicle according to claim 1, wherein a rubber servo motor cover is mounted on the servo motor.

13. The servo motor layout structure for a vehicle according to claim 2, wherein a rubber servo motor cover is mounted on the servo motor.

14. The servo motor layout structure for a vehicle according to claim 3, wherein a rubber servo motor cover is mounted on the servo motor.

15. The servo motor layout structure for a vehicle according to claim 4, wherein a rubber servo motor cover is mounted on the servo motor.

16. The servo motor layout structure for a vehicle according to claim 1, wherein a weight is provided to the body frame with the weight covering a side of the servo motor.

17. The servo motor layout structure for a vehicle according to claim 2, wherein a weight is provided to the body frame with the weight covering a side of the servo motor.

18. The servo motor layout structure for a vehicle according to claim 1, wherein:

the servo motor is provided with the servo motor biased on one side based upon a center line of the vehicle body in a bottom view of the vehicle body; and the exhaust valve is provided with the exhaust valve biased on the other side based upon the center line of the vehicle body in the bottom view of the vehicle body.

19. The servo motor layout structure for a vehicle according to claim 2, wherein:

the servo motor is provided with the servo motor biased on one side based upon a center line of the vehicle body in a bottom view of the vehicle body; and the exhaust valve is provided with the exhaust valve biased on the other side based upon the center line of the vehicle body in the bottom view of the vehicle body.

20. Servo motor layout structure adapted to be used with a vehicle comprising:

a swing arm having a front end adapted to be swingably supported by at least either of a body frame or an engine and a rear end adapted to support a rear wheel;

an exhaust pipe adapted to be connected to the engine;

an exhaust valve operatively connected to the exhaust pipe;

a servo motor for driving the exhaust valve; and a cable for coupling the exhaust valve and the servo motor, said exhaust valve and said servo motor being arranged on the downside of the swing arm in a side view.

* * * * *